United States Patent [19]

Braden

[11] Patent Number: 4,841,945
[45] Date of Patent: Jun. 27, 1989

[54] AUTOMATIC TENNIS BALL FEEDING AND SERVING APPARATUS

[76] Inventor: Victor K. Braden, 22395 Via Alondra, Trabuco Canyon, Calif. 92679

[21] Appl. No.: 47,617

[22] Filed: May 7, 1987

[51] Int. Cl.$^4$ .................. A63B 69/40; A63B 69/38
[52] U.S. Cl. ........................... 124/78; 124/6; 124/1; 273/29 A
[58] Field of Search ............ 124/1, 4, 6, 49, 51, 124/78; 273/201; 198/443, 803.13; 221/253, 254, 200, 203

[56] References Cited

U.S. PATENT DOCUMENTS

| | | | |
|---|---|---|---|
| 2,209,340 | 7/1940 | Landry | 198/443 |
| 3,000,537 | 9/1961 | Simon | 221/253 X |
| 3,306,613 | 2/1967 | Mainers | 124/6 X |
| 3,468,407 | 9/1969 | Furst | 198/443 |
| 3,814,283 | 6/1974 | Cioth | 221/178 |
| 4,082,177 | 4/1978 | Aidlin et al. | 198/443 X |
| 4,086,903 | 5/1978 | Scott | 124/78 |
| 4,299,383 | 11/1981 | Yuasa | 124/78 X |

FOREIGN PATENT DOCUMENTS 2912510 10/1979 Fed. Rep. of Germany ...... 221/200

OTHER PUBLICATIONS

Magazine Advertisement, "The Jugs Jr. Pitching Machine", (No Date of Identification).

Primary Examiner—Randolph A. Reese
Assistant Examiner—John Ricci
Attorney, Agent, or Firm—Howard R. Lambert

[57] ABSTRACT

An automatic tennis ball feeding and serving apparatus comprises a ball hopper, wheel-type tennis ball projector and conveyor for transporting tennis balls from the hopper to the ball projector. A frame is provided to which the hopper, ball projector and conveyor are fixed, with the ball projector elevated above the hopper. The conveyor includes an endless loop, motor driven conveyor chain which is inclined at a small angle from the vertical. A ball delivering chute is positioned between the conveyor and the ball projector to gravity feed balls from the conveyor to the ball projector. Connected to the conveyor chain are a plurality of spaced apart, tennis ball transporters, each having a shallow ball receiving recess. Associated with each ball transporter is a ball anti-stacking element which prevents the stacking of two or more tennis balls on the same ball transporter. Each anti-stacking element projects outwardly from the conveyor belt about 1½ tennis ball diameters above each ball transporters. A ball agitator, comprising a plurality of rotatably driven fingers which alternatively project upwardly through openings in the bottom of the hopper, continually tumble tennis balls in the hopper to prevent bridging of the balls and to thereby insure reliable ball loading onto the ball transporters.

17 Claims, 3 Drawing Sheets

AUTOMATIC TENNIS BALL FEEDING AND SERVING APPARATUS

BACKGROUND OF THE INVENTION

1. Field of the Invention:

The present invention relates generally to the field of automatic ball throwing apparatus and more particularly to automatic ball throwing apparatus having ball feeding mechanisms incorporated thereinto, and still more particularly to tennis ball feeding and throwing apparatus.

2. Discussion of the Background:

As is well known, a number of sports involve the hitting of thrown or otherwise projected balls. Notable among such sports are baseball and tennis, both of which require continual and diligent practice to improve a player's skill in hitting or returning the ball, to help a player increase his or her strength and, in many cases, to increase the player's stamina.

It might be presumed that the best type of training practice for players of sports involving the hitting or returning of a projected ball would be in an actual playing situation. For instance, it might be presumed that the best practice for a baseball batter would be to have another player pitching balls to him or her. Similarly, it might be presumed that the best practice for a tennis player would be for the player actually to play against a skilled tennis player. In many instances, such presumptions may be correct, since batting against a live pitcher or playing against a live tennis player involves actual and variable competitive conditions.

Nevertheless, such practice against live opponents is not always possible or practical and, moreover, is often not even the optimum practice. For example, unless the individual practicing is a star player for a professional team, it may simply be too expensive to provide full time access to a live training pitcher or expert tennis partner. Even if it were feasible cost-wise to have a full time practice partner, a practicing individual may often require a special amount of repeative practice with respect to a particular pitch or type of serve. As an illustration, a tennis player may need particular practice on his or her backhand stroke, or may need practice returning balls served or hit to particular areas of the tennis court, or may need practice in returning high or low balls. In such cases, a live pitcher or opponent may not be capable of consistently providing the type of pitch or serve needed by the individual in training.

To overcome at least some of these problems, automatic ball pitching and throwing machines have been used for a number of years. These machines are virtually tireless and are generally fairly capable of providing at least somewhat consistently thrown or served balls. To throw the balls, such machines typically employ either compressed air (especially for light balls like tennis balls) or one or a pair of rotatably driven ball-ejecting wheels. Because of their loud, air-blast noise, compressed air-type ball throwing machines are not particularly favored. Therefore, most ball throwing machines use a rotatably driven wheel or pair of wheels. Assuming, as an example, the use of a pair of rotatably driven wheels, the two wheels are spaced apart about the diameter of the ball to be projected thereby and are typically rotatably driven in opposite directions. Balls to be projected by the machine are fed into the gap between the wheels, are frictionally picked up by the wheels and are expelled at what are often high velocities. It is not uncommon for the position of the rotably driven wheels to be adjustable so that the direction of ball ejection can be varied according to particular practice needs.

With attention now being specifically directed to tennis ball throwing (serving) machines, with which the present invention is principally concerned, one of the problems with known, heretofore available automatic machines is that the ball feeding mechanisms associated therewith have typically been relatively unreliable. Available machines, for example, generally employ an overhead tennis ball hopper located above the ball serving mechanism. Such overhead ball hoppers are generally disc-shaped and are rotatably driven about a vertical axis. A gravity-flow chute is mounted between the hopper and a delivery point at the ball projecting mechanism. Hoppers of this type are constructed having one or more ball-sized openings in the bottom which are positioned for periodic alignment with the chute inlet opening as the hopper is rotated. When these holes are aligned, a ball falls from the hopper into the chute and is conducted thereby to the ball projecting mechanism. The ball feeding rate of such machines is determined by the rotational speed of the hopper and the number of ball feeding holes in the hopper.

A persistent problem associated with feeding tennis balls to a ball throwing or serving mechanism is, however, that the "fuzzy" fabric covering or coating new tennis balls acts somewhat like "VELCRO," thereby tending to make the tennis balls stick together in the hopper and so impending the free falling of the balls when the hopper and chute openings are aligned. As a result, sometimes no balls are fed when they should be and/or balls frequently do not clear the aligned openings before the hopper rotates far enough to catch the ball between structure defining the hopper and chute openings. When this occurs, hopper rotation becomes jammed and ball feeding is interrupted until the trapped ball is manually removed. In addition to being a nuisance to the player being served tennis balls by the machine, undue stresses become applied to the machine, maintenance costs of the machine are increased and excessive wear of the tennis balls may occur. Moreover, the jamming of such types of machines is usually considered unprofessional and tends to downgrade the training facility in the minds of players using the machines. Still further, when individuals are paying by the hour, as is usually the case, for use of the practice machines, they expect the machines to be operating all the time and not to be frequently out of service to clear ball jamming conditions.

Still another disadvantage of such overhead hopper tennis ball throwing machines is that the ball serving mechanisms are generally required to be fairly low to the ground. This causes the tennis balls always to be lobbed upwardly, which is not always the best throwing position insofar as simulation of actual tennis playing is concerned. It is, instead, usually more desirable to have the balls served from a higher elevation to more correctly simulate most playing conditions.

A further problem associated with tennis balls tending to stick to one another is that, depending upon the type of feeding mechanism involved, more than one ball may be fed to the throwing mechanism at the same time or at an unintentionally rapid rate. In such cases when one ball is thrown immediately after another, the second ball may take the individual using the machine by surprise, with the possibility that the individual may be struck and injured by the unexpected second ball or may, at least, undesirably start flinching or tightening up whenever a ball is served towards him or her.

For these and other reasons, improvements are desirable in tennis ball feeding and throwing apparatus to improve the operation of such machines. Therefore, it is a principal objective of the present invention to provide such an improved ball feeding and throwing (serving) apparatus.

SUMMARY OF THE INVENTION

Automatic tennis ball feeding and throwing apparatus, according to the present invention comprises a tennis ball holding hopper having substantially closed sides and a bottom; tennis ball projecting means having a ball infeed region and a ball ejection region; a ball chute having a ball inlet end and a ball discharge end and an elongate ball conveyor including an endless loop conveyor belt having connected thereto at least one, and preferably more than one, ball transporter. There is included an apparatus frame and means for mounting the hopper and ball projecting means to the frame in a mutually spaced apart relationship with the ball projecting means elevated above the hopper, for mounting the ball chute to the frame with the ball discharge end in communication with the ball infeed region of the ball projecting means and for mounting the conveyor to the frame in a ball loading relationship with the hopper and in a ball feeding relationship with the inlet end of the ball chute.

The apparatus further includes means for mechanically agitating tennis balls contained in the hopper so as to substantially prevent the bridging of balls in the hopper and the consequent forming of ball voids. The reliable loading of tennis balls from the hopper onto the ball transporters connected to the conveyor is thus enabled.

It is preferred that the ball feeding and throwing apparatus further include means for assuring that balls do not stack above one another on the ball transporters. In a preferred embodiment of the invention, the means for assuring the non-stacking of balls include a plurality of ball anti-stack elements and means for connecting the anti-stack elements to the conveyor belt so as to project outwardly therefrom in the direction of the ball transporters. Each one of the anti-stack elements is connected to the conveyor belt a preestablished distance, d, above a corresponding one of the ball transporters, the distance, d, being, for example, about equal to 1½ tennis ball diameters.

The mechanical agitating means may, according to an embodiment of the invention, comprise a plurality of elongate fingers fixed to a shaft, means for mounting the shaft at lower regions of the hopper so that the fingers extend upwardly through openings in the bottom of the hopper and into engagement with tennis balls held in the hopper when the shaft is rotated. Means are included for causing such rotation of the shaft and thereby causing rotation of the fingers and consequent agitation of tennis balls in the hopper.

The ball chute is preferably mounted to the frame so as to cause balls fed into the inlet end to roll or fall by gravity downwardly through the chute to the ball discharge end thereof. Preferably, but not necessarily, the ball projecting means comprise first and second, mutually spaced apart wheels between which balls are fed from the ball chute. At least one of the wheels is rotatably driven in a direction causing tennis balls fed to the ball infeed region to be drawn in between the wheels and be ejected at a substantial velocity therefrom.

BRIEF DESCRIPTION OF THE DRAWINGS

The present invention may be more readily understood by a consideration of the following description taken in conjunction with the accompanying drawings in which.

DESCRIPTION OF THE PREFERRED EMBODIMENT

Figure 1:
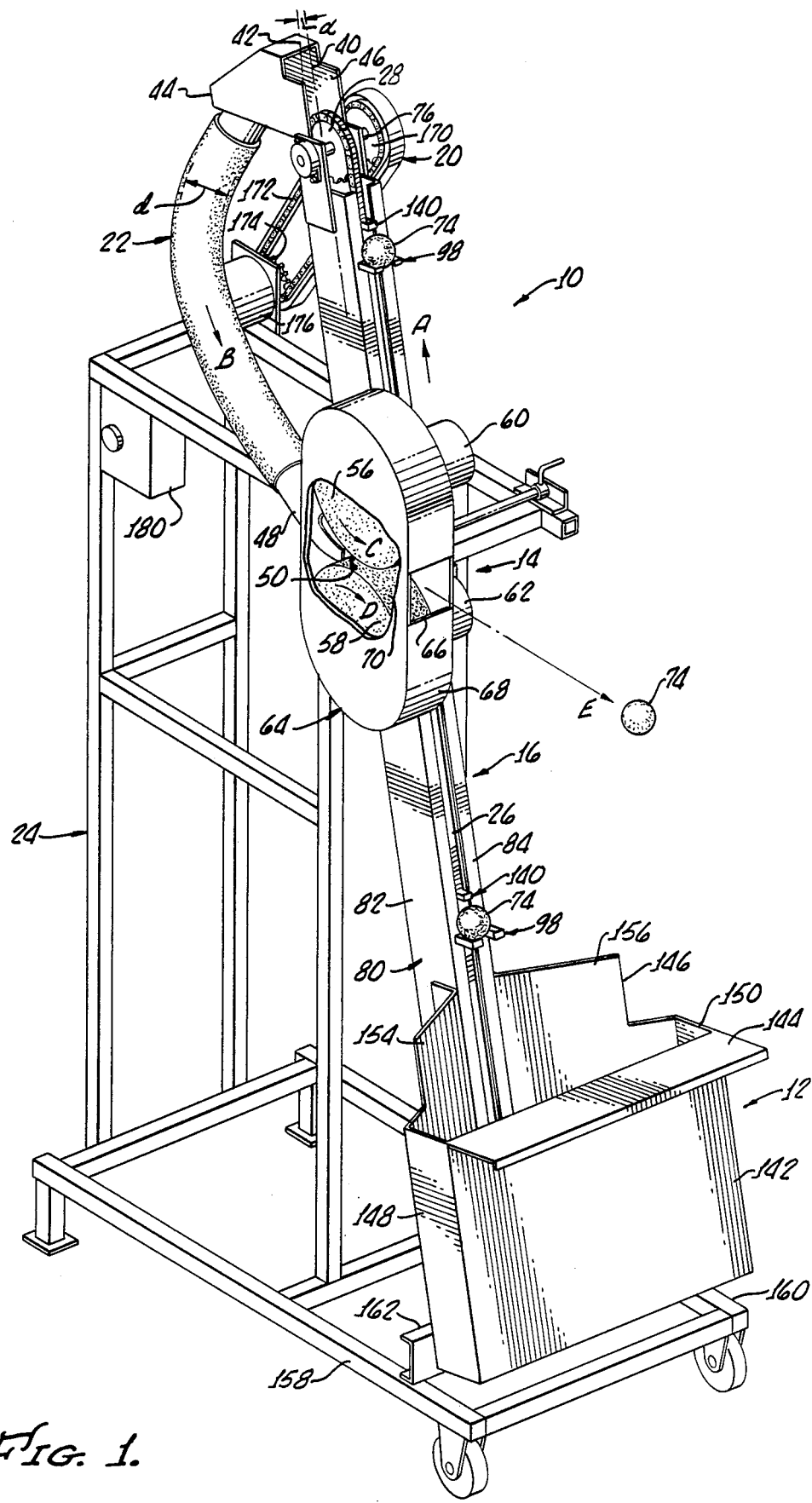
FIG. 1 is a partially cutaway perspective drawing of the automatic tennis ball feeding and throwing apparatus of the present invention showing major portions of the apparatus.

As shown in FIG. 1, a ball feeding and throwing apparatus 10, especially for tennis balls, comprises generally a ball hopper 12, ball projecting means 14, ball transporting (conveying) means 16, conveyor drive means 20 and a ball chute 22. A rigid frame 24 is provided to which hopper 12 and ball projecting means 14 are mounted in a vertically spaced apart relationship with the ball projecting means substantially elevated above the hopper. Advantageously, as more particularly described below, ball projecting means 14 may be mounted to frame 24 so as to be in approximate vertical alignment with hopper 12.

Ball transporting means 16, which include an endless loop, bicycle chain-type conveyor belt or chain 26 (FIGS. 1–4) entrained over an upper, drive sprocket 28 (FIG. 1) and a lower, idler sprocket 30 (FIGS. 2–4), are mounted to frame 24 so that a longitudinal axis 40 thereof is at a small angle, $\alpha$, with a vertical axis 42. Also as more particularly described below, ball transporting means 16 are configured and mounted to frame 24 so that lower end regions of conveyor belt 26 are in ball receiving (pick-up) relationship with hopper 12 and so that upper end regions of the conveyor belt are at an elevation above ball projecting means 14. As a result, belt drive sprocket 28 is located above ball projecting means 14 and idler sprocket 30 is located below hopper 12.

Ball chute 22 is mounted to frame 24 so that an upper, ball inlet end portion 44 thereof is in ball receiving communication with upper end regions 46 of ball transporting means 16 and a lower, ball outlet end 48 of the chute is in ball feeding communication with a ball infeed region 50 of ball projecting means 14. Moreover, ball chute 22 has an inner diameter, d, and is inclined so that balls transported upwardly by conveyor means 16

(direction of Arrow "A," FIG. 1) from hopper 12 and which are discharged into chute inlet end portion 44 from conveyor upper end region 46 roll or fall, under the force of gravity, downwardly through the chute (direction of Arrow "B") to in-feed region 50 of ball projecting means 14.

Ball projecting means 14, as shown in FIG. 1, comprise respective upper and lower wheels 56 and 58. Connected to upper wheel 56 is a drive motor 60 which drives such wheel in a counterclockwise direction (direction of Arrow "C") and connected to lower wheel 58 is a drive motor 62 which drives such wheel in a clockwise direction (direction of Arrow "D"). Ordinarily both motors 60 and 62 operate at the same speed so that both wheels 56 and 58 are driven at the same RPM, although in opposite rotational directions. For reasons of safety, wheels 56 and 58 are preferably enclosed in a oblong housing 64. An aperture 66, formed in a forward face 68 of housing 64 in alignment with a ball projecting region 70 of means 14, is provided through which balls 74 are ejected (lobbed) by wheels 56 and 58 in the direction of Arrow "E".

Conveyor means 16 importantly functions to transport balls 74 from hopper 12 to chute 22. As above mentioned, conveyor means 16 comprise an endless loop conveyor chain 26 which is entrained over upper, drive sprocket 28 and lower idler sprocket 30. Sprockets 28 and 30 are nonrotatably mounted on respective sprocket shafts 76 (FIG. 1) and 78 (FIGS. 2–4) which are, in turn, conventionally journaled for rotation in respective upper and lower end regions of an elongate, rigid conveyor support assembly 80.

Principally comprising conveyor support assembly 80 is a long, square or rectangular cross section tubular member 82 having two angles 84 attached to forward-facing regions thereof in a manner forming a generally C-shaped structure (FIG. 2) at the forward face of the member. Installed in the C-shaped structure so formed is a C-channel 86 which is constructed of a tough plastic material, such as Nylon or Teflon, having a relatively low coefficient of friction and good resistance to wear and abrasion. Channel 86 functions as a partial guideway for conveyor 26, as described below.

Figure 2:
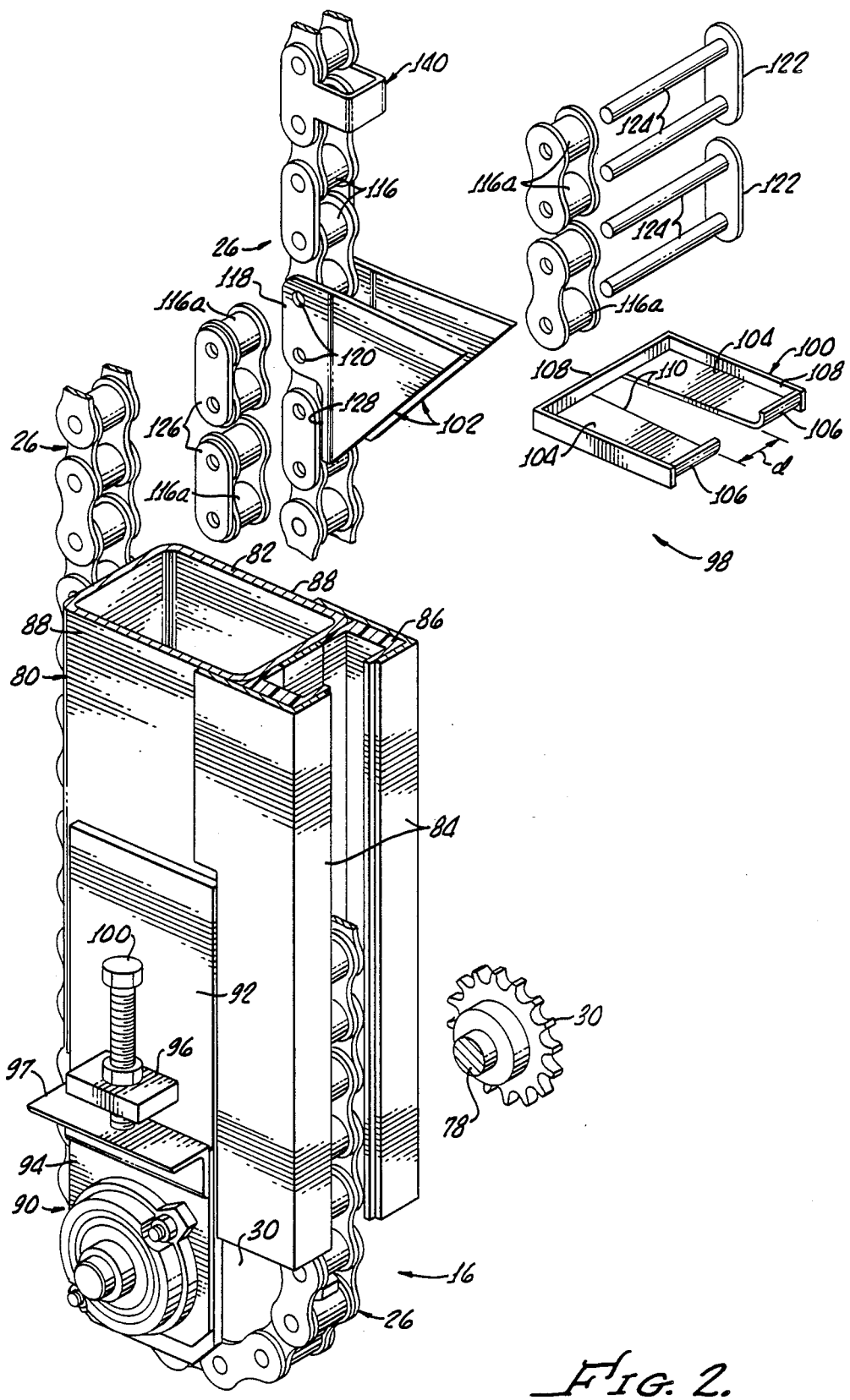
FIG. 2 is an exploded perspective drawing of a representative one of the tennis ball transporters and an associated ball anti-stacking element, both of which are connected as part of a conveyor portion of the apparatus of FIG. 1, and further showing lower end regions of the ball conveyor.

At the lower end of tubular member 82, at a lefthand side 88 thereof, is preferably connected, as shown in FIG. 2, adjustable chain tensioning means 90, in which idler sprocket shaft 78 is journaled for rotation. A mirror image chain tensioning means 90a (FIG. 3) is installed on the opposite side 88a of member 82 in a symmetrical manner. Forming adjusting means 90 are inner and outer plates 92 and 94, respectively, the inner plate having fixed thereto a threaded element 96 and the outer plate having fixed thereto a small angle 98. Idler sprocket shaft 78 is rotatably mounted through outer plate 94. A bolt 100, threaded through element 96 and bearing against angle 98, is provided for causing (or permitting) relative longitudinal movement between inner and outer plates 92 and 94 in a manner effectively lengthening (or shortening) conveyor support assembly 80 and thereby tightening (or loosening) conveyor chain 26, as may be required for proper conveyor operation or for chain replacement. Plates 92 and 94 are slidingly connected together in a manner not shown permitting limited relative longitudinal movement therebetween. Tensioning means 98a is formed and operates in the same manner illustrated and described for means 90 and therefore requires no further description.

As shown in FIG. 1, ball transporting means 16 further comprises at least one ball transporter 98 which is connected to conveyor chain 26 in the manner described below. Preferably, however, a plurality of transporters 98 are connected in an equally spaced apart relationship to conveyor chain 26. Ball transporters 98, as more particularly shown in FIG. 2, comprise a ball transporting member 100 and a pair of generally triangular support elements 102 onto which the member is fixed. Member 100 in turn comprises a pair of thin, generally rectangular elements 104, each of which is formed having an arcuate, turned-up forward edge region 106. There is also included a three sided frame 108, open at the forward side, to the inside of which elements 104 are symmetrically fixed along their outer side and rearward edges such that facing, inner side edges 110 thereof are laterally separated a distance, d, at forward edges 106. Elements 104 may, as shown, be shaped so that inner side edges 110 converge slightly towards one another in a rearward direction. Frame 108 projects upwardly above elements 104 along outer side and rear edges thereof and with upwardly curved forward edge regions 106 of the elements forms a shallow, generally square, recess or pocket into which tennis balls 74 seat after being picked up by transporters 98 from hopper 12.

Conveyor chain 26 is conventionally formed from a large number of short links 116 which are serially interconnected by connecting links 118 (FIG. 2). Each of support elements 102 is formed having a short, rearwardly extending mounting tab or ear 118 through which are formed a spaced apart pair of chain-mounting apertures 120. The spacing between apertures 120 is the same as the spacing of corresponding apertures in each of chain links 116.

Guiding of conveyor chain 26 in channel 86 is provided by a pair of chain links 116a positioned on each side of support elements 102. An upper (as shown in FIG. 2) master link 122 has two long pins 124 which, upon assembly, extend through one link 116a, one support element 102, a chain link 116, the other support element 102, another link 116a and finally through a connector plate 126. This upper master link 122 thereby attaches elements 102, and hence transporter 98, to chain 26. Support elements 102 are configured so that when they are connected in the described manner to chain 26 and the chain is pulled straight in the region of the transporter 98, transport member 100 connected thereto projects forwardly from the chain at 90 degrees. After assembly and when transporters 98 are on the forward side of support assembly 80, rearward facing edges 128 of elements 102 bear against chain 26 below element ears 118 and thereby help support member 100 in its ball-transporting position.

A second master link 122 is installed through a link 116a, a link 116, a link 116a and a connector plate 126 below support element ears 118. The two links 116a on each side of conveyor chain 26 project sidewardly at each transporter 98 and importantly function as guides which are disposed in side regions of channel 86, thereby substantially preventing side-to-side and fore and aft movement of ball transporters 98 on the ball transporting side of conveyor support assembly 80.

Figure 4:
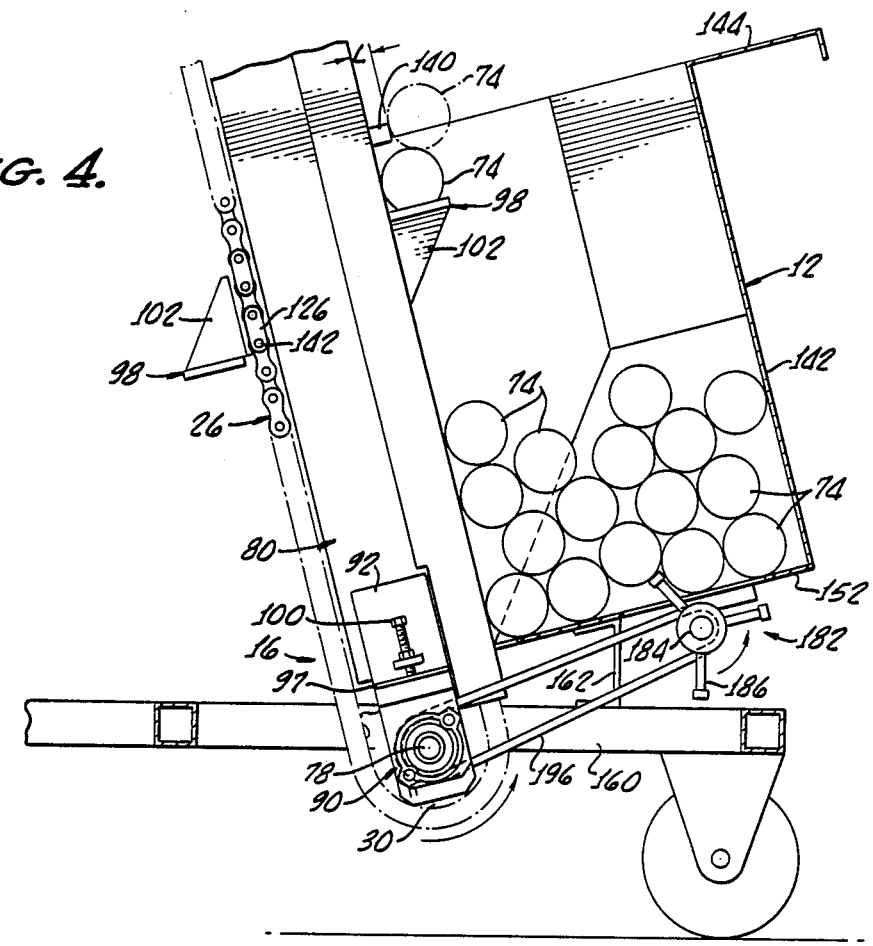
FIG. 4 is a longitudinal (vertical) cross sectional view taken along line 4—4 of FIG. 1 showing additional features of a representative one of the ball transporters and an associated one of the ball anti-stacking elements of FIG. 2 and also showing additional features of the agitating means of FIG. 3.

It has been found that as tennis balls 74 are picked up from hopper 12 by transporters 98, two balls sometimes, because of the interlocking nature of the ball covering, slightly adhere to one another and stack one above the other on a transporter 98 (FIG. 4). When this occurs and the two balls are delivered at virtually the same instant to projecting means 14, the two balls are "fired" in rapid succession by the ball projecting means. Although such ball stacking and double firing may occur only infrequently, it is still undesirable and can possibly be hazardous to users of the ball throwing apparatus.

To prevent ball stacking on transporters 98, there is provided in association with each transporter an anti-stacking element 140. As shown in FIGS. 2 and 4, each anti-stacking element 140 is connected to conveyor chain 26 by a master chain link 142 which extends through the element and an adjacent pair of chain links 116 and is secured by a locking plate 126. Anti-stacking elements 140 are spaced about one and a half (1½) tennis ball diameters, D, above associated ball transporters 98 and extend outwardly in the forward direction parallel to the transporters when the transporters are on the ball transporting side of conveyor support assembly 80. The projecting length, 1, of elements 140 is preferably between about one quarter (¼) to one half (½) of the ball diameter, D. In any event, the length, 1, of elements 140 is sufficient to unbalance a ball 74 stacked above a ball received into the associated transporter 98 and to cause the stacked ball to fall off the ball resting on transporter 98. Elements 140 do not, however, project so far forwardly from conveyor chain 26 that they interfere with the loading of a ball into each transporter as the conveyor advances the transporters upwardly through hopper 12 to transport balls 74 from the hopper to chute 22.

Figure 3:
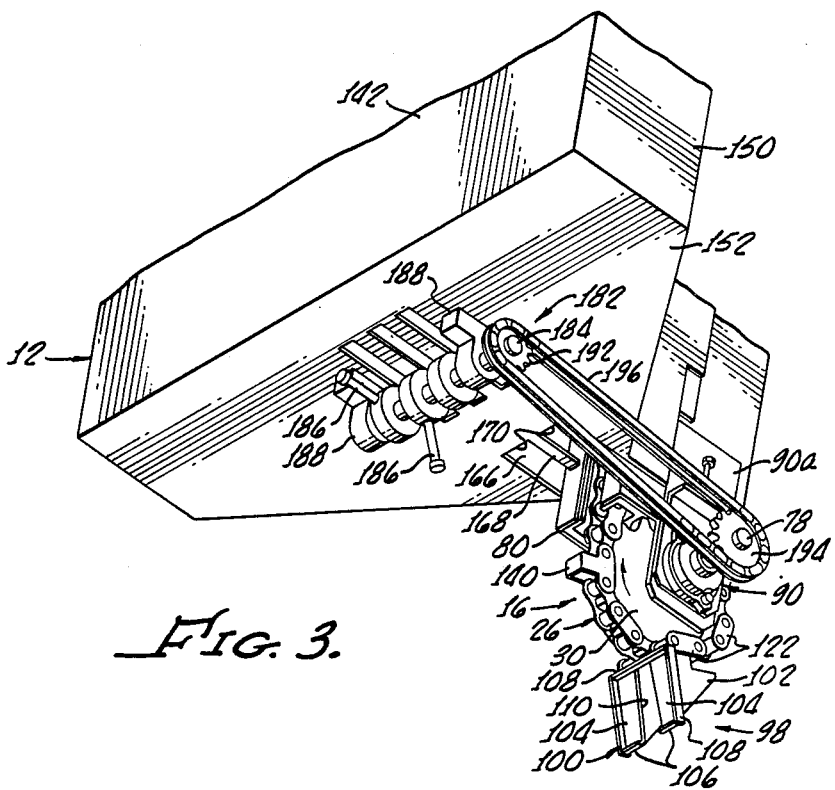
FIG. 3 is a perspective drawing of ball agitating means associated with a hopper of the apparatus of FIG. 1, showing the relationship of the agitating means and the ball hopper and showing lower end regions of the ball conveyor.

Hopper 12, as shown in FIGS. 1, 3 and 4, comprises a front panel 142, which may have a forwardly extending flange 144 at the top thereof; a split rear panel 146; first and second side panels 148 and 150, respectively, and a bottom panel 152. As shown in FIG. 1, hopper 12 may have an open top to enable balls 74 to be loaded into the hopper. Such loading may be done manually. Alternatively, apparatus 10 may be installed below grade at one end of a tennis teaching court or lane having a sloping playing surface so that balls 74 lobbed by the apparatus and either returned or missed by anyone using the facility roll back down the slope and are automatically are funneled into hopper 12 for reuse. Back panel 146 is preferably formed in two sections 154 and 156 each of which is attached along a inner edge region to conveyor support assembly 80 (FIG. 1). Hopper 12 is preferably connected at bottom panel 152 or at lower regions to members 158 and 160 of frame 24 by means of a transverse beam 162 (FIGS. 1 and 4); such hopper-to-frame connection also serves to help anchor conveyor means 16 to the frame.

As can be seen from FIG. 3, an aperture 166 is formed in hopper bottom panel 152 adjacent to conveyor support assembly 80 to enable entry of ball transporters 98 upwardly into the hopper. Balls 74 are retained in hopper by an elongate ear portion 168 of bottom panel 152 which extends rearwardly into aperture 166 from a forward edge 170 thereof. Ear portion 168 is located and sized to be cleared by the gap between elements 104 of transporter member 100, aperture 166 being just large enough to admit transporters 98 into hopper 12.

Attached to upper sprocket shaft 76, in addition to drive sprocket 28, is a driver sprocket 170 (FIG. 1). This driver sprocket 170 is interconnected by a short drive chain 172 to a motor sprocket 174 attached to a conveyor drive motor 176. The ball feeding rate of conveyor means 16 depends upon the rate at which drive motor 176 drived conveyor chain 26 (in the ball transporting direction of Arrow "A") and also upon the number and spacing of ball transporters 98 connected to the conveyor chain. By way of example, with no limitation intended or implied, conveyor chain 26 may have attached thereto a sufficient number of ball transporters 98 and be driven by motor 176 at a rate causing a tennis ball 74 to be delivered from hopper 12 to chute 22 about every four (4) seconds. Preferably motor 176 is a variable speed motor so that the ball feeding rate can be easily and quickly varied, at a control panel 180 attached to frame 24, according to particular practice requirements. It is also within the scope of the invention that the speed of drive motor 176 be programmable, for example, at panel 180, so as to vary the ball feeding rate as a function of time, as sometimes may be desirable.

Also because of the manner described above in which ball transporters 98 are releasably connected to conveyor chain 26 (by link 122, FIG. 2), transporters can be easily removed from or added to the conveyor chain to change the ball delivery rate in the event, for example, that a constant speed drive motor 176 is used.

It has been determined by the present inventor that at least occasionally tennis balls 74 may become wedged in hopper 12 in such a manner that regions void of balls may be formed where ball transporters 98 traverse the hopper. Of course when such bridging occurs, balls 74 cannot be picked up by transporters 98 and apparatus stops throwing tennis balls even though conveyor chain 26 continues to be driven by motor 176. Such bridging of tennis balls 74 in hopper 12 is caused, at least in part, by the VELCRO-like action of the fabric ball covering, and tends to occur relatively frequently when hopper 12 is manually loaded on a periodic basis. In contrast, the relatively continual infeeding of balls into hopper 12 when apparatus 10 is installed below grade at a teaching court or lane tends to prevent ball bridging and/or to break up any bridges that may form before ball feeding problems can result.

The use of hopper vibrators or shakers to prevent the bridging of balls 74 in hopper 12 has not proven to be very satisfactory for various reasons. For example, if sufficient hopper shaking is provided to prevent ball bridging, the entire apparatus is shaken excessively, thereby affecting, at least to some extent, repeatability of the ball lobbing. Also, an effective level of vibration tends to be undesirably noisy.

As an effective alternative to hopper vibration, the present inventor provides apparatus 10 with agitating means 182 (FIGS. 3 and 4), which mechanically tumbles balls 74 within hopper 12. Comprising ball agitating means 180 are an agitator shaft 184 and a plurality (three, as shown) of elongate agitating elements or fingers 186, the fingers being fixed to the shaft in a mutually spaced apart relationship and at equal angular spacings. Agitator shaft 184 is rotatably mounted, in journals 188, to hopper bottom panel 152 forwardly of aperture 166 and transversely across hopper 12. Narrow, elongate slots 190 are formed in bottom panel 152 normal to shaft 184 and in alignment with fingers 186. Slots 190 are sized relative to fingers 186 so that when shaft 184 is rotated, the fingers rotate upwardly through the slots and mechanically impact those tennis balls 74 which are at or near the bottom of hopper 12. This impacting of tennis balls 74 by fingers 186 causes bouncing of the impacted balls and a general tumbling of at least those balls which are in lower regions of hopper 12, the resulting continual agitation of the balls effectively preventing any bridging of balls in the hopper and assures reliable, consistant loading of balls from the hopper onto ball transporters 98.

Agitator shaft 184 is rotatably driven through a chain sprocket 192 which is fixed to one end of the shaft. Another chain sprocket 194 is fixed to one end of lower conveyor shaft 78 in alignment with sprocket 192 on agitator shaft 184 (shafts 78 and 184 being parallel). A short drive chain 196 is entrained over sprockets 192 and 194 so that agitator shaft 184 is rotated in unison with conveyor shaft 78. Consequently, balls 74 are agitated in hopper 12 whenever conveyor means 16 are operating.

Although there has been described above a ball feeding and throwing apparatus in accordance with the present invention for the purpose of illustrating the manner in which the invention may be used to advantage, it is to be appreciated that the invention is not so limited. Accordingly, any and all variations and modifications which may occur to those skilled in the art are to be considered to be within the scope and spirit of the invention as defined by the appended claims.

What is claimed is:

1. Automatic tennis ball feeding and throwing apparatus which comprises:
   (a) a hopper for holding a number of tennis balls, the hopper having substantially closed sides and a bottom;
   (b) tennis ball projecting means having a ball infeed region and a ball ejection region;
   (c) an elongate ball conveyor including an endless loop conveyor belt having connected thereto at least one tennis ball receiving and transporting member, said conveyor having a ball discharge region;
   (d) an apparatus frame;
   (e) means for mounting the hopper and ball projecting means to the frame in a mutually spaced apart relationship with the ball projecting means elevated above the hopper, and for mounting the conveyor to the frame intermediate the hopper and the ball projecting means, and with a lower region thereof in a ball loading relationship with the hopper;
   (f) ball transferring means for transferring balls from the ball discharge region of the conveyor into the ball infeed region of the ball projector;
   (g) means for driving the conveyor belt in a direction transporting a ball loaded from the hopper onto said at least one ball receiving and transporting member to the ball transferring means;
   (h) means configured for mechanically agitating tennis balls in the hopper so as to substantially prevent the bridging of tennis balls in the hopper and the consequent forming of ball voids, the reliable loading of a tennis ball from the hopper onto said at least one ball receiving and transporting member connected to the conveyor being thereby enabled; and
   (i) non-stacking means connected to the conveyor for preventing more than one ball at a time from being transported on said at least one ball receiving and transporting member from the hopper to the ball transferring means.

2. The ball feeding and throwing apparatus as claimed in claim 1, wherein the non-stacking means include a number of ball anti-stack elements equal to the number of ball receiving and transporting members and means for connecting the anti-stack elements to the conveyor belt so as to project outwardly therefrom in the direction of the ball receiving and transporting members, each one of the anti-stack elements being connected to the conveyor belt a distance, d, above a corresponding one of the ball receiving and transporting members.

3. The tennis ball feeding and throwing apparatus as claimed in claim 2 wherein the distance, d, is equal to about $1\frac{1}{2}$ tennis ball diameters.

4. The tennis ball feeding and throwing apparatus as claimed in claim 1 wherein the mechanical ball agitating means comprise a plurality of elongate fingers fixed to a shaft and means for mounting said shaft relative to the hopper so that said fingers extend upwardly a substantial distance into lower regions of the hopper and into contact with tennis balls held in the hopper, said fingers extending through openings formed in the bottom of the hopper when the shaft is rotated, and further including means for causing rotation of the shaft so as to thereby rotate said fingers through the bottom of the hopper to cause agitation of tennis balls held in the hopper.

5. The tennis ball feeding and throwing apparatus as claimed in claim 1 wherein the ball transfering means include a ball chute having a ball inlet and a ball discharge end, the ball chute being mounted to the frame so as to cause tennis balls fed into the inlet end of the chute from the ball discharge region of the conveyor to travel under gravity downwardly through the chute to the ball discharge end thereof and thereby to the ball infeed region of the ball projecting means.

6. The tennis ball feeding and throwing apparatus as claimed in claim 1 wherein the tennis ball projecting means comprise first and second, mutually spaced apart wheels between which tennis balls are fed from the ball transferring means, and include means for rotatably driving at least one of said wheels in a direction causing tennis balls fed to the ball infeed region to be drawn between the wheels and to be ejected from the ball ejection region at a substantial velocity.

7. Automatic tennis ball feeding and throwing apparatus which comprises:
   (a) a hopper for holding a number of tennis balls, the hopper having substantially closed sides and a bottom;
   (b) tennis ball projecting means having a ball infeed region and a ball ejection region;
   (c) an elongate ball conveyor including an endless loop conveyor belt having connected thereto a plurality of tennis ball receiving and transporting members, said conveyor having a ball discharge region;
   (d) an apparatus frame;
   (e) means for mounting the hopper and ball projecting means to the frame in a mutually spaced apart relationship with the ball projecting means elevated above the hopper, and for mounting the conveyor to the frame intermediate the hopper and the ball projecting means, and with a lower region thereof in a ball loading relationship with the hopper;
   (f) ball transferring means for transferring balls from the ball discharge region of the conveyor into the ball infeed region of the ball projector;
   (g) means for driving the conveyor belt in a direction transporting tennis balls loaded from the hopper onto the ball receiving and transporting members to the ball transferring means;

(h) non-stacking means connected to the conveyor for preventing more than one ball at a time from being transported on any of the ball receiving and transporting members from the hopper to the ball transferring means.

8. The ball feeding and throwing apparatus as claimed in claim 7 wherein the non-stacking means include a plurality of ball anti-stack elements and means for connecting the anti-stack elements to the conveyor belt so as to project outwardly therefrom in the direction of the ball receiving and transporting members, each one of the anti-stack elements being connected to the conveyor belt a distance, d, above a corresponding one of the ball receiving and transporting members.

9. The tennis ball feeding and throwing apparatus as claimed in claim 8 wherein the distance, d, is equal to about $1\frac{1}{2}$ tennis ball diameters.

10. The tennis ball feeding and throwing apparatus as claimed in claim 7 including means configured for mechanically agitating tennis balls contained in the hopper so as to substantially prevent the bridging of tennis balls in the hopper and the consequent forming of ball voids, the reliable loading of tennis balls from the hopper onto the ball receiving and transporting members connected to the conveyor being thereby enabled.

11. The tennis ball feeding and throwing apparatus as claimed in claim 10 wherein the mechanical agitating means comprise a plurality of elongate fingers fixed to a shaft and means for mounting said shaft relative to the hopper so that said fingers extend upwardly a substantial distance into lower regions of the hopper and into contact with tennis balls held in the hopper through openings formed in the bottom of the hopper when the shaft is rotated, and further including means for causing rotation of the shaft and therefore of said fingers to cause agitation of tennis balls in the hopper.

12. The tennis ball feeding and throwing apparatus as claimed in claim 7 wherein the tennis ball projecting means comprise first and second, mutually spaced apart wheels between which tennis balls are fed from the ball transferring means, and include means for rotatably driving at least one of said wheels in a direction causing tennis balls fed to the ball infeed region to be drawn between the wheels and to be ejected from the ball ejection region at a substantial velocity.

13. Automatic tennis ball feeding and throwing apparatus which comprises:
(a) a hopper for holding a number of tennis balls, said hopper having substantially closed sides and a bottom;
(b) tennis ball projecting means having a ball infeed region and a ball ejection region;
(c) a ball chute having a ball inlet end and a ball discharge end;
(d) an elongate tennis ball conveyor including an endless loop conveyor belt having connected thereto a plurality of tennis ball receiving and transporting members;
(e) an apparatus frame;
(f) means for mounting the hopper and ball projecting means to the frame in a mutually spaced apart relationship with the ball ejecting means elevated above the hopper, for mounting the ball chute to the frame with the ball discharge end in communication with the ball infeed region of the ball projecting means and for mounting the conveyor to the frame in a ball loading relationship with the hopper and in a ball feeding relationship with the inlet end of the ball chute;
(g) means for driving the conveyor belt in a direction transporting balls loaded from the hopper onto the ball receiving and transporting members to the ball inlet end of the ball chute;
(h) means for mechanically agitating tennis balls contained in the hopper so as to substantially prevent the bridging of balls in the hopper and the consequent forming of ball voids, the reliable loading of tennis balls from the hopper onto the ball receiving and transporting members connected to the conveyor being thereby enabled; and
(i) means connected to the conveyor belt for assuring that tennis balls loaded from the hopper onto the ball receiving and transporting members do not stack above one another on the ball receiving and transporting members.

14. The tennis ball feeding and throwing apparatus as claimed in claim 13 wherein the means for assuring the non-stacking of tennis balls include a plurality of ball anti-stack elements and means for connecting the anti-stack elements to the conveyor belt so as to project outwardly therefrom in the direction of the ball receiving and transporting members, each one of the anti-stack elements being connected to the conveyor belt a preestablished distance, d, above a corresponding one of the ball receiving and transporting members.

15. The tennis ball feeding and throwing apparatus as claimed in claim 14 wherein the distance, d, is equal to about $1\frac{1}{2}$ tennis ball diameters.

16. The tennis ball feeding and throwing apparatus as claimed in claim 13 wherein the mechanical agitating means comprise a plurality of elongate fingers fixed to a shaft and means for mounting said shaft relative to the hopper so that said fingers extend upwardly into lower regions of the hopper and into contact with tennis balls in the hopper through openings formed in the bottom of the hopper when the shaft is rotated, and further including means for causing the rotation of the shaft and therefore of the fingers fixed thereto in a manner causing the fingers to agitate tennis balls held in the hopper.

17. The tennis ball feeding and throwing apparatus as claimed in claim 13 wherein the tennis ball projecting means comprise first and second, mutually spaced apart wheels between which tennis balls are fed from the ball chute, and include means for rotatably driving at least one of said wheels in a direction causing tennis balls fed to the ball infeed region to be drawn between the wheels and to be ejected from the ball ejection region at a substantial velocity.

* * * * *